United States Patent [19]

Yoshida et al.

[11] Patent Number: 4,999,394

[45] Date of Patent: Mar. 12, 1991

[54] MATERIAL FOR RETAINERS OF TAPERED ROLLER BEARINGS

[75] Inventors: Teruo Yoshida; Hiroshi Ueno, both of Osaka, Japan

[73] Assignee: Koyo Seiko Co., Ltd., Osaka, Japan

[21] Appl. No.: 394,694

[22] Filed: Aug. 16, 1989

Related U.S. Application Data

[63] Continuation-in-part of Ser. No. 155,395, Feb. 12, 1988, abandoned.

[30] Foreign Application Priority Data

Feb. 13, 1987 [JP]  Japan ................................. 62-32135

[51] Int. Cl.$^5$ ............................................. C08K 7/14
[52] U.S. Cl. ..................................... 524/514; 525/184
[58] Field of Search ........................ 524/514; 525/184

[56] References Cited

U.S. PATENT DOCUMENTS 4,798,855  1/1989  Lausberg et al. .................. 524/514

FOREIGN PATENT DOCUMENTS 3313919  10/1984  Fed. Rep. of Germany ...... 524/514
54-031456  3/1979  Japan ................................. 524/514

*Primary Examiner*—Lewis T. Jacobs
*Attorney, Agent, or Firm*—Armstrong, Nikaido, Marmelstein, Kubovcik & Murray

[57]  ABSTRACT

A retainer for a tapered roller bearing comprising a polyamide resin, 10 to 20% by weight of an elastomer and 15 to 30% by weight of a reinforcing fiber.

3 Claims, 2 Drawing Sheets

MATERIAL FOR RETAINER OF TAPERED ROLLER BEARINGS

This application is a continuation-in-part of application Ser. No. 07/155,395, filed Feb. 12, 1988, now abandoned, incorporated herein in its entirety by reference.

BACKGROUND OF THE INVENTION

The present invention relates to the retainers of tapered roller bearings, and it more particularly relates to a particularly effective synthetic resin composition to be used for the retainers of tapered roller bearings.

Synthetic resin materials are widely used for the retainers or cages of antifriction bearings such as ball bearings. However, conventional synthetic resin materials still have problems when used for the retainers of tapered roller bearings, and thus need to be improved in performance. For example, polyamide resins, such as nylon 66, undergo marked dimensional variations due to hygroscopicity, rendering the inner ring assembly subject to separation. When reinforced with glass fiber or carbon fiber, nylon 66, and similar polyamide resins, exhibit reduced dimensional variations but have poorer elongation, with result that the rib portion of the retainer is prone to damage when the retainer is assembled into a bearing or during handling.

SUMMARY OF THE INVENTION

The main object of the present invention is to provide a retainer for tapered roller bearings made of a material which is less susceptible to dimensional variations and to damage.

The material to be used for the retainer of a tapered roller bearing according to this invention is characterized in that it comprises a polyamide resin, 10 to 20% by weight of an elastomer and 15 to 30% by weight of a reinforcing fiber.

Examples of suitable polyamide resins include nylon 66 and the like. Examples of useful elastomers include polybutadiene rubber and the like. Examples of useful reinforcing fibers are glass fiber, carbon fiber, etc. Preferably, a mixture of polyamide resin and elastomer is reinforced with such fiber to obtain a composite material. The nylon 66, polybutadiene, glass and carbon fibers, and other comparable components of the instant invented retainer are all commercially available commodities purchasable from several sources.

The polymer mixture to be used for retainer material of the present invention has incorporated therein the reinforcing fiber and is therefore diminished in dimensional variations due to hygroscopicity. Moreover, the presence of the elastomer imparts enhanced impact strength and increased elongation to the material, rendering the retainer less susceptible to damage during assembling or handling. The retainer of this invention being based on a synthetic resin material, is light-weight and has a longer life, giving products which require lower maintenance.

Thus, the present invention provides a retainer material which is diminished in dimensional changes, resistant to damage, lightweight and serviceable over a prolonged period of time, all of which are highly improved properties.

DESCRIPTION OF THE PREFERRED EMBODIMENTS

To substantiate the advantages of the invention described above, examples of the invention are given below.

First, retainers were prepared from six materials listed in Table 1 as Comparative Examples 1 to 4 and Examples 1 and 2.

TABLE 1

| Example | Component | Glass fiber content (wt. %) | Rubber content (wt. %) |
|---|---|---|---|
| Comp. Ex. 1 | Nylon 66 only | 0 | 0 |
| Comp. Ex. 2 | Nylon 66 reinforced with glass fiber | 8.3 | 0 |
| Comp. Ex. 3 | Same as above | 25 | 0 |
| Comp. Ex. 4 | Mixture of nylon 66 and polybutadiene rubber | 0 | 10 |
| Ex. 1 | Mixture of nylon 66 and polybutadiene rubber, reinforced with glass fiber | 15 | 10 |
| Ex. 2 | Same as above | 30 | 20 |

*In each example, the remainder of the product in addition to the percentages set forth, was nylon 66.

The retainers of the comparative examples and the examples were annealed, under conditions of 120° C. for 2 hours, 150° C. for 3 hours or 180° C. for 4 hours, to check them for contraction due to annealing. The retainers were also immersed in tap water at room temperature (25° C.) and checked for expansion due to the absorption of water by measuring their dimensions from time to time. The retainers were thereafter immersed in water for 1 month to determine the saturation water absorption ratio and the resulting dimensional variation.

Figure 1:
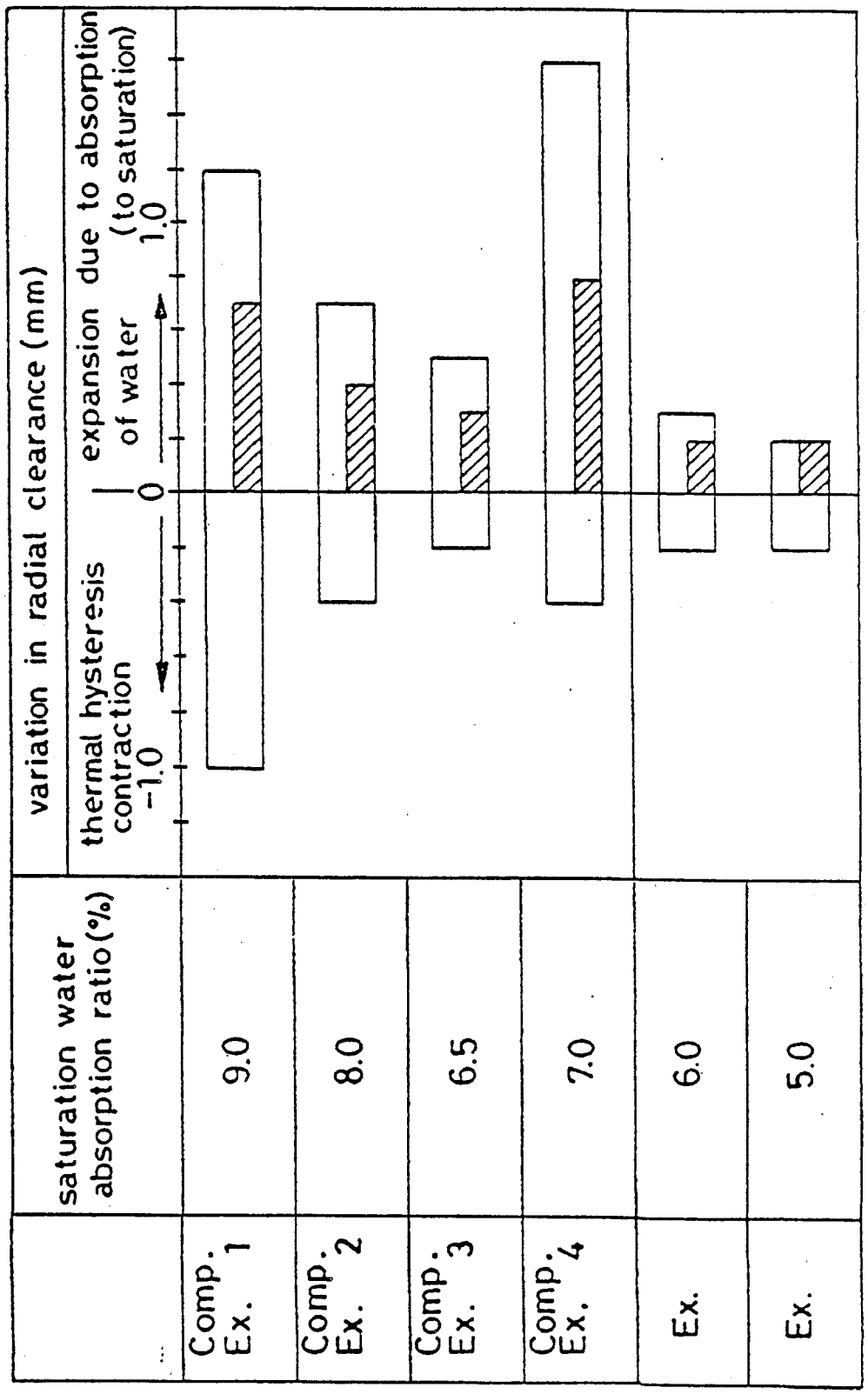
FIG. 1 is a graph showing the results obtained by testing the retainers of comparative examples and examples of the invention for thermal hysteresis contraction and expansion due to absorption of water.

FIG. 1 shows the amount of thermal hysteresis contraction resulting, for example, from annealing the molded retainer rings at 180° C. for 4 hours, and the amount of expansion due to the absorption of water to saturation, in terms of variations in the radial clearance. The hatched portion of the expansion diagram represents the amount of expansion due to 5% water absorption.

The illustrated results reveal the following. The examples of the invention are not greater than the comparative examples in the amount of thermal hysteresis contraction and are substantially smaller than Comparative Example 4 in the amount of expansion due to water absorption. The invention examples having about the same glass fiber content as Comparative Examples 2 and 3 are smaller than the latter in the amount of expansion.

Figure 2:
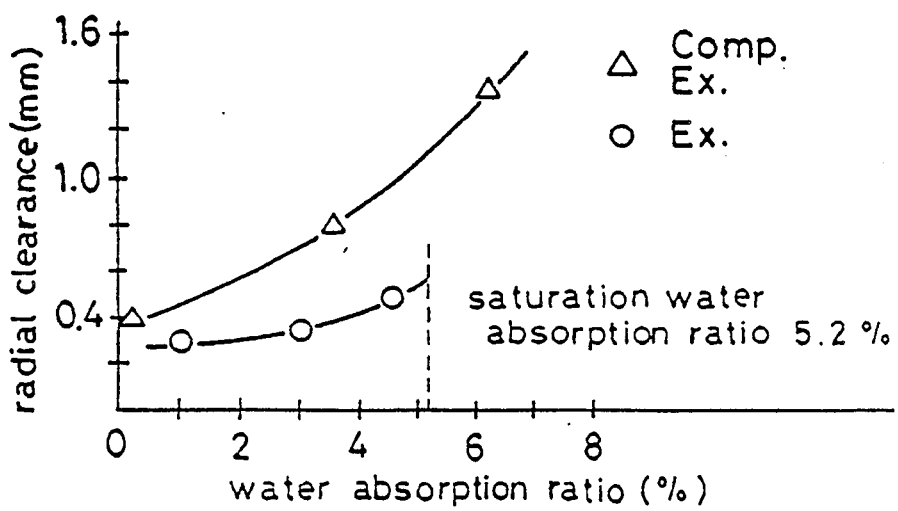
FIG. 2 is a graph showing the relation between the water absorption ratio and the dimensional variation as established by testing a comparative retainer and a retainer of the invention.

FIG. 2 shows the relation between the water absorption ratio and the radial clearance determined for Example 1 and Comparative Example 1. The graph indicates that the dimensional variation of Example 1 is smaller than that of Comparative Example 1.

Next, the retainers of Example 1 and Comparative Example 1 were immersed in grease at 120° C. or 150° C. and tested for resistance to grease. The grease used was Li-mineral oil grease, #2 in consistency, which is a multipurpose grease generally used for passenger motor vehicle wheels.

Figure 3:
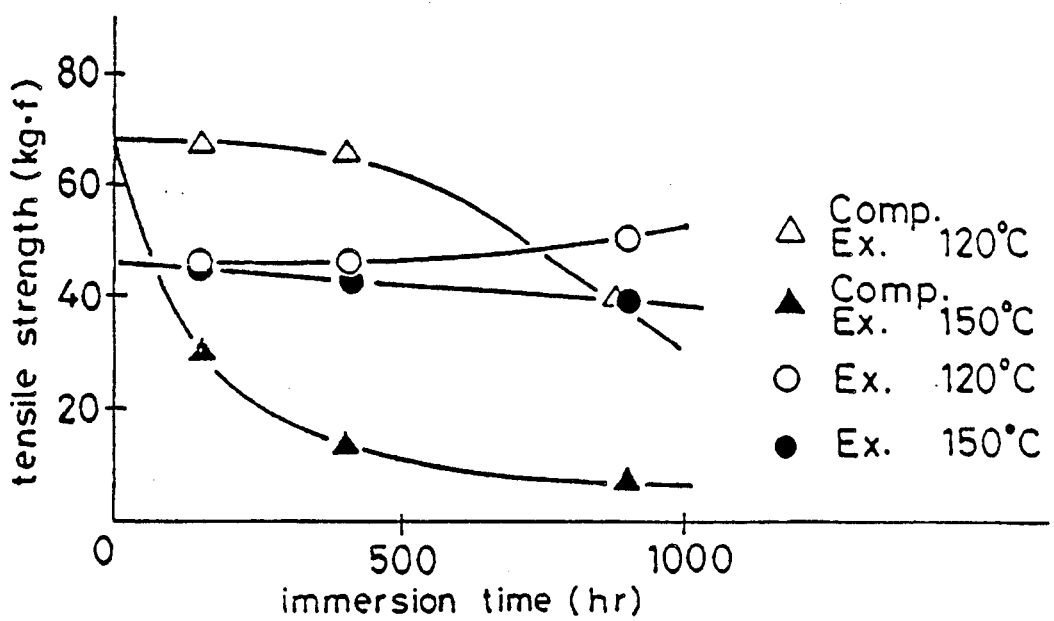
FIG. 3 is a graph showing the results of grease immersion tests conducted on the same retainers as shown in FIG. 2.

FIG. 3 shows the test results, which reveal the following. Comparative Example 1 exhibits decreasing tensile strength with time, especially a marked reduction at the higher temperature (150° C.), whereas in the case of Example 1, the tensile strength remains almost unchanged despite prolonged immersion time.

The foregoing test results show that the retainers made of the material of this invention have: low saturation water absorption ratios and dimensional variations due to the absorption of water and have high dimensional stability and greatly improved resistance to grease.

Next, two bearing sets were prepared, each of which comprised two tapered roller bearings fabricated using retainers of Example 1, and combined together back-to-back. The retainers were tested for durability by rotating the inner ring and subjecting the outer ring to a load under the following conditions.

| Radial load: | 400 kg f |
|---|---|
| Thrust load: | 160 kg f |
| Speed of rotation of inner ring: | 910 r.p.m. |
| Nut clamping force: | 23 ± 2 kg f (center) |
| Test period: | 1200 hours |
| Grease: | Li-mineral oil grease (same as above) |
| Temperature: | Allowed to rise spontaneously (60-70° C.) |

The results were listed in Table 2, in which the two bearings of each of the sets (sets 1 and 2) are designated by A and B.

TABLE 2

| | Iron in grease (wt. %) | Dimensional change in retainer (%) | | Strength of retainer (new one, 12.6 kg f) |
|---|---|---|---|---|
| | | Small end inside diameter | Large end inside diameter | |
| Set 1 | | | | |
| Bearing A | 0.02 | −0.09 | −0.13 | 11.9 (−5.6%) |
| Bearing B | 0.03 | −0.12 | −0.15 | 12.7 (+0.8%) |
| Set 2 | | | | |
| Bearing A | 0.07 | −0.07 | −0.08 | 12.3 (−2.4%) |
| Bearing B | 0.05 | −0.10 | −0.06 | 12.8 (+1.6%) |

The durability test revealed the following. The iron content of the grease was lower than 0.1%, indicating that the grease remained substantially free of contamination. The resulting dimensional variations (changes) were less than 0.15% and exceedingly smaller than in conventional products (which are usually less than about 1%). Variations in the strength of retainers were also small, hence the invented retainers showed high strength.

Retainers of Example 1 were tested for heat resistance in the same manner as in the above durability test under the following conditions. For heating, a band heater was provided around the bearing assembly.

| Radial load: | 300 kg f |
|---|---|
| Thrust load: | 120 kg f |
| Speed of rotation of inner ring: | 910 r.p.m. |
| Test period: | 500 hours |
| Grease: | Li-mineral oil grease (same as above) |
| Temperature: | 135 ± 5° C. |

TABLE 3

| | Iron in grease (wt. %) | Dimensional change in retainer (%) | | Strength of retainer (new one, 12.6 kg f) |
|---|---|---|---|---|
| | | Small end inside diameter | Large end inside diameter | |
| Set 1 | | | | |
| Bearing A | * | −0.14 | −0.09 | 14.4 (+14.3%) |
| Bearing B | * | −0.07 | −0.06 | 13.1 (+4.0%) |
| Set 2 | | | | |
| Bearing A | * | −0.06 | −0.07 | 12.9 (+2.4%) |
| Bearing B | * | −0.10 | −0.12 | 13.7 (+8.7%) |

*Not measurable due to carbonization.

The heat resistance test reveals the following. Although the grease was completely carbonized, no abnormalities were found in the appearance of the retainers. Despite the exposure to a high temperature, the resulting dimensional variations were less than 0.014%, hence the products exhibited very high heat resistance. The strength of the retainers was improved by 2 to 14% and therefore entailed no problem. Even after the 1200-hour durability test and the heat resistance test at a high temperature of 135±5° C., the retainers of the invention retained a good appearance, exhibited only small variations in dimensions and in strength and were found satisfactory in properties. These test results indicate that the retainer material of the invention is outstanding in durability and heat resistance.

What is claimed is:

1. A retainer for a tapered roller bearing comprising a mixture of 15 to 30% by weight reinforcing glass fiber, 10 to 20% by weight of a polybutadiene elastomer and the remainder a nylon 66 resin.

2. A retainer as claimed in claim 1 wherein said retainer consists essentially of about 15% glass fiber, about 10% polybutadiene and about 75% nylon 66.

3. A retainer as claimed in claim 1 wherein said retainer consists essentially of about 30% glass fiber, about 20% polybutadiene and about 50% nylon 66.

* * * * *

UNITED STATES PATENT AND TRADEMARK OFFICE
CERTIFICATE OF CORRECTION

PATENT NO. : 4,999,394

DATED : March 12, 1991

INVENTOR(S) : Yoshida et al

It is certified that error appears in the above-identified patent and that said Letters Patent is hereby corrected as shown below:

On the title page, Item [54], and in column 1, lines 2 and 3, "MATERIAL FOR RETAINERS OF TAPERED ROLLER BEARINGS", should read --MATERIALS FOR RETAINERS OF TAPERED ROLLER BEARINGS--.

Signed and Sealed this

Twenty-eighth Day of July, 1992

Attest:

DOUGLAS B. COMER

*Attesting Officer*     *Acting Commissioner of Patents and Trademarks*